United States Patent [19]

[11] Patent Number: 4,704,620

Ichihashi et al.

[45] Date of Patent: Nov. 3, 1987

[54] TEMPERATURE CONTROL SYSTEM AND INK JET PRINTER UTILIZING THE TEMPERATURE CONTROL SYSTEM

[75] Inventors: Hiroo Ichihashi, Hiratsuka; Masakazu Ozawa, Ebina; Atsushi Saito, Yokohama; Ryuichi Ebinuma, Hiratsuka, all of Japan

[73] Assignee: Canon Kabushiki Kaisha, Tokyo, Japan

[21] Appl. No.: 901,413

[22] Filed: Aug. 28, 1986

[30] Foreign Application Priority Data

Sep. 4, 1985 [JP] Japan ............................... 60-193865

[51] Int. Cl.$^4$ ............................................ G01D 18/00

[52] U.S. Cl. ................................ 346/140 R; 118/302; 118/667; 165/61; 219/364

[58] Field of Search .................... 346/140, 75; 239/75, 239/128; 222/54, 146.1; 165/58, 61, 65, 66; 219/364, 400; 118/667, 666, 302

[56] References Cited

U.S. PATENT DOCUMENTS 4,460,904 7/1984 Oszczakiewicz ....................... 346/75

OTHER PUBLICATIONS

Ruddy, G. A.; Viscosity Control Circuit, IBM TDB, vol. 16, No. 10, Mar. 1974, p. 3295.

*Primary Examiner*—Joseph W. Hartary

*Attorney, Agent, or Firm*—Fitzpatrick, Cella, Harper & Scinto

[57] ABSTRACT

A temperature control system for an ink jet printer has a plurality of head units each having a heater and a temperature sensor, and a fan for cooling the plurality of head units in which the fan has a heat transfer coefficient represented by a gradient of a first line connecting a maximum heat generated by heads corresponding to a sum of heat generated by the head units and heat generated by said heaters and a maximum operable temperature of said printer, and said heaters each has a heat transfer coefficient represented by a gradient of a second line connecting said maximum heat generated by the heads and a minimum operable temperature of the printer.

11 Claims, 7 Drawing Figures

TEMPERATURE CONTROL SYSTEM AND INK JET PRINTER UTILIZING THE TEMPERATURE CONTROL SYSTEM

BACKGROUND OF THE INVENTION

1. Field of the Invention

The present invention relates to a temperature control system and an ink jet printer utilizing the temperature control system, and more particularly to a temperature control system in an ink jet printer having a plurality of ink jet units and an ink jet printer utilizing such a temperature control system.

2. Related Background Art

In a color ink jet printer having a plurality of head units having a plurality of nozzles, it is rare that all head units are uniformly driven, and in many cases, a head unit which discharges ink of a particular color is more frequently driven than other head units.

Many head drive systems are known. When head units which discharge inks by thermal energy are used, the head units are accompanied by a temperature increase whatever drive system may be used.

The more frequently the head unit is driven, the larger is the temperature increase. Thus, the temperature charges from head unit to head unit. The temperature increase of the head unit is also caused by heat generated by printer transformers, transistors and motors.

The ink jet printer is usually provided with a cooling fan to prevent the temperature increase.

The ink jet printer head has the following two temperature requirements. The first requirement is an operable temperature range (environment temperature range in which the printer is operable) defined by a specification. It may be 0–40° C.

The other requirement is a stable discharge temperature range of the head. It may be 15–50° C. The lower limit of 15° C. of the stable discharge temperature range means that if the temperature is lower than the lower limit, the viscosity of the ink is lowered and stable discharge is not attained. The upper limit of 50° C. means that if the temperature is higher than the higher limit, gas in the ink separates so that the ink cannot be stably discharged and durability of the head parts is lowered. Those limits are experimentarily determined and vary with material and property of the ink, and reliability, characteristic and required performance of the apparatus.

However, because of the temperature requirements described above, it is necessary to heat the printer by a heater when the temperature is low and cool the printer by a fan when the temperature is high.

In prior art printers, a temperature sensor is used to sense a temperture of the entire head unit, and if it is lower than a predetermined temperature, the heater is energized, and if it is higher than another predetermined temperature, the fan is energized.

However, not all head units are uniformly driven to raise temperature as described above but the temperature rise varies from head unit to head unit. The fans are not provided one for each of the head units because of space and cost considerations. As a result, the head unit which does not need heating or cooling may be heated or cooled and the temperature range described above may not be maintained.

When a heater having a high heating power is used to keep the head units at the desired temperature even if the fan is energized, power consumption increases or ink in the head unit which is not properly cooled is abruptly heated too much and durability and recording characteristic are deteriorated.

When a heat transfer coefficient of the fan is high, the cooling effect will be sufficient but the size of the fan increases, which leads to increases of size and weight of the printer and increase of power consumption. In addition, a fan having a cooling power which exceeds a heater power may be selected.

When the fan and the heater are variably controlled. the control must be very precise and hence a complex control circuit is required.

When a high heating power heater and a high cooling power fan are used, they are frequently turned on and off in order to keep the temperature in the desired range, and it is difficult to attain a precise control, or even if it is possible, the cost may be very high.

SUMMARY OF THE INVENTION

It is an object of the present invention to provide a temperature control system which can readily control temperature of head units within a proper discharge temperature range, and an ink jet printer which uses such a temperature control system.

It is another object of the present invention to provide a temperature control system which readily control temperature of a plurality of head units within a proper discharge temperature range by one fan and a plurality of heaters provided for the plurality of head units, and an ink jet printer which uses such a temperature control system.

It is another object of the present invention to provide a temperature control system in which a heater and a temperature sensor are provided for each of a plurality of head units, a fan for cooling all head units are provided, and the heaters and the fan are energized and deenergized to keep the temperatures of the head units within a stable discharge temperature range, and an ink jet printer which uses such a temperature control system.

It is another object of the present invention to select heaters and fan which are in balance in the heating power of the heaters and the cooling power of the fan and economic in a total cost, and simplify the control therefor.

It is another object of the present invention to provide a temperature control system for an ink jet printer having a plurality of head units each having a heater and a temperature sensor, and a fan for cooling said plurality of head units, wherein said fan has a heat transfer coefficient represented by a gradient of a first line connecting a maximum heat generated by heads corresponding to a sum of heats generated by said head units and heats generated by said heaters and a maximum operable temperature of said printer, and said heaters each has a heat transfer coefficient represented by a gradient of a second line connecting said maximum heat generated by said heads and a minimum operable temperature of said printer.

It is other object of the present invention to provide an ink jet printer comprising:

a plurality of head units each having a heater and a temperature sensor;

a fan for cooling said plurality of head units; and temperature control means for processing signals from said temperature sensors to energize said heaters and/or said fan as required;

said fan having a heat transfer coefficient no smaller than that represented by a gradient of a first line connecting a maximum heat generated by heads corresponding to a sum of heat generated by said heaters and a maximum operable temperature of said ink jet printer;

said heaters each having a heat transfer coefficient represented by a gradient of a second line connecting said maximum heat of said heads and a minimum operable temperature of said ink jet printer.

BRIEF DESCRIPTION OF THE DRAWINGS

FIGS. 1 to 3 show one embodiment of the present invention, in which

FIG. 1 shows a head assembly,

FIG. 2 shows a relationship between a temperature and a heat generated by a head, FIG. 3 illustrates a control method.

DETAILED DESCRIPTION OF THE PREFERRED EMBODIMENTS

Figure 1:
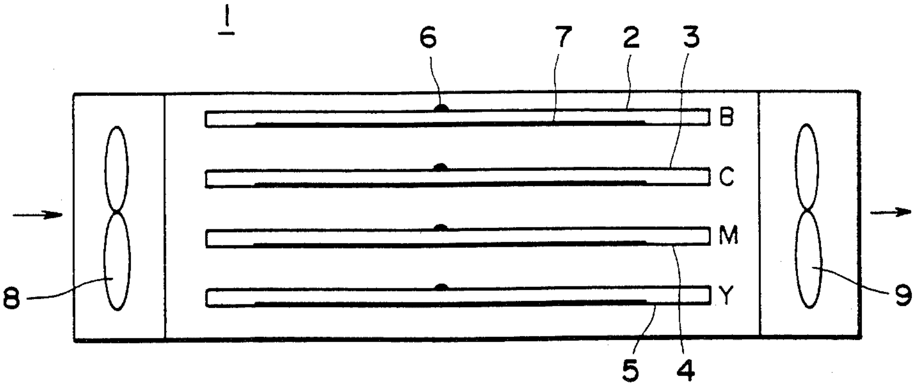

FIG. 1 shows an entire head assembly. Numeral 1 denotes a head assembly Head units 2–5 for black, cyan, magenta and yellow are parallelly arranged in a frame. A temperature sensor 6 and a heater 7 are arranged at predetermined positions in each of the head units 2–5. Fans 8 and 9 for sucking air in the same direction are arranged on the left and right of the frame of the head assembly 1.

The following control is performed to the above arrangement.

In an actual record operation, the four head units do not necessarily generate the same heat. It may be possible that the black head unit 2 fully discharges the ink and rises to 50° C., for example, and the associated fan is rotated while other three head units 3–5 do not discharge inks and are at lower than 15° C., for example, and the associated heaters are energized. In this case, the heats by the heaters may be robbed by the fan so that the temperature may not rise to 15° C. Accordingly, the flow rate of the fan and the heat of the heater must be carefully selected In FIG. 2, a heat transfer equation $W=k\cdot\Delta t$ (where k is a heat transfer coefficient) is shown with an ordinate representing heat generated by the heads (including heat generated by the heaters), that is, a sum of the heat generated by the head units and the heat generated by the heaters, and an abscissa representing a temperature of the head units. The line has a gradient k. The fans and the heaters are selected by utilizing this line.

In a most severe condition with respect to the cooling fan, the head temperature must be kept at 50° C. with an external temperature being 40° C. and the head fully discharging (generating heat of 140 W (maximum heat generated by the head)). This is illustrated by a first line A. Since the gradient k of the line A is 14, a fan having a heat transfer coefficient of 14 is selected. The heater may be energized simultaneously with the fan and the temperature must be kept at 15° C. even under such a condition.

In a worst condition to the heater, an external temperature is 0° C., for example, and the other head fully discharges the ink and is at higher than 50° C. and hence the fan is energized. The heat of the heater which can heat the head from 0° C. to 15° C. under such a condition is determined by a second line B shown in FIG. 2. Since the temperature difference between the heat source of 140 W and an external temperature (0° C.) is kept to be 50° C. by the energization and deenergization of the fan, the gradient k is 2.8. The gradient of 2.8 is achieved by a duty factor of the energization and deenergization of the fan. The heat source which can assure 15° C. under this condition must have 42 W as determined by a line C shown in FIG. 2. Thus, if a heater having a heat power of at least 42 W is provided, the head unit can be heated to 15° C. even if the fan is rotated. In this manner, the fan and the heater are selected.

When those fan and heater are used to control temperature, the fan is energized and deenergized at 50° C. on the higher temperature limit. Accordingly, the temperature is maintained around 50° C. and there is no operational margin. In addition, it is not so often that the head unit fully discharges the ink so that it rises to 50° C. Accordingly, the temperature to energize the fan is set to 40° C. to provide the operational margin.

Figure 2:
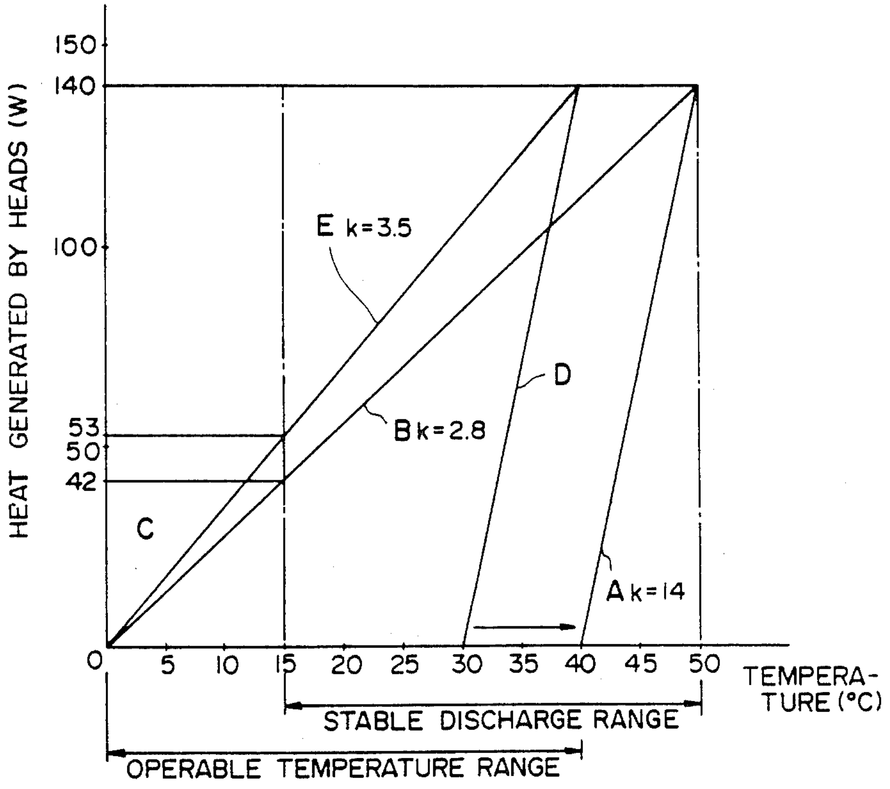

A line D shown in FIG. 2 is drawn to keep the temperature of the head unit at lower than 50° C. with the external temperature being at 40° C. It has the same gradient as the line A. Accordingly, the fan having k=14 is required as is done when the fan is energized and deenergized at 50° C. From a line E, it is seen that the heat to be generated by the heater is 53 W.

Accrodingly, the fan which can realize the heat transfer coefficient k of 14 can be energized and deenergized at 40° C., and has a flow rate of 2.1 $m^3/$ min per head unit as a practical data, is needed.

When the heater is energized and deenergized at 15° C., it should have a heat power of 53 W per head unit.

A specific operation is described below.

(1) 0° C. <head unit (HU)<15° C.

Heater (53 W/HU) is energized unit 15° C. Heater is energized and deenergized at 15° C.

(2) 15° C. ≦HU<40° C.

No operation.

(3) 40° C. ≦HU

Fan is energized.

Fan is energized and deenergized at 40° C.

Figure 3:
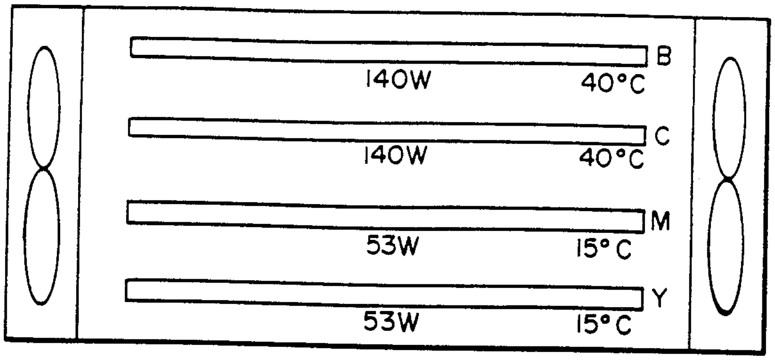

(4) Temperature distribution is not uniform because of discharge by a particular HU. The HU B(black) and C(cyan) are fully discharging inks and at higher than 40° C., and the HU M (magenta) and Y (yellow) do not discharge ink and are heated by the heaters. The status of the head assembly under this condition is shown in FIG. 3.

In accordance with the present invention, the heater and the temperature sensor are provided for each of the plurality of head units and the fan is provided to cool all of the head units, and the heaters and the fan are energized and deenergized so that the temperature of the head units is kept within the stable discharge temperature range. Accordingly head units having different heat generation can be maintained within the proper discharge temperature range by one fan and the plurality of heaters.

The stable discharge temperature range and the operable temperature range and their maximum and minimum temperature vary with the material, property and characteristic of the ink, design and reliability of the printer and required print quality. In any condition, the fan and the heater can be selected in the manner described above.

In accordance with the present invention, the temperature can be controlled within the desired range without frequently energizing and deenergizing the heater and the fan.

In accordance with the present invention, when the head which is not discharging the ink is to be heated and the head which is fully discharging the ink is to be cooled, the heaters and the fan may be kept energized to keep the head units within the desired temperature range.

Accordingly, in accordance with the present invention, very precise temperature control is attained without requiring a complex apparatus. The present invention can achieve the precise temperature control with a low cost. The present invention achieve a size reduction of the apparatus and precise temperature control with a low cost even when the plurality of heads are independently driven.

Figure 4:
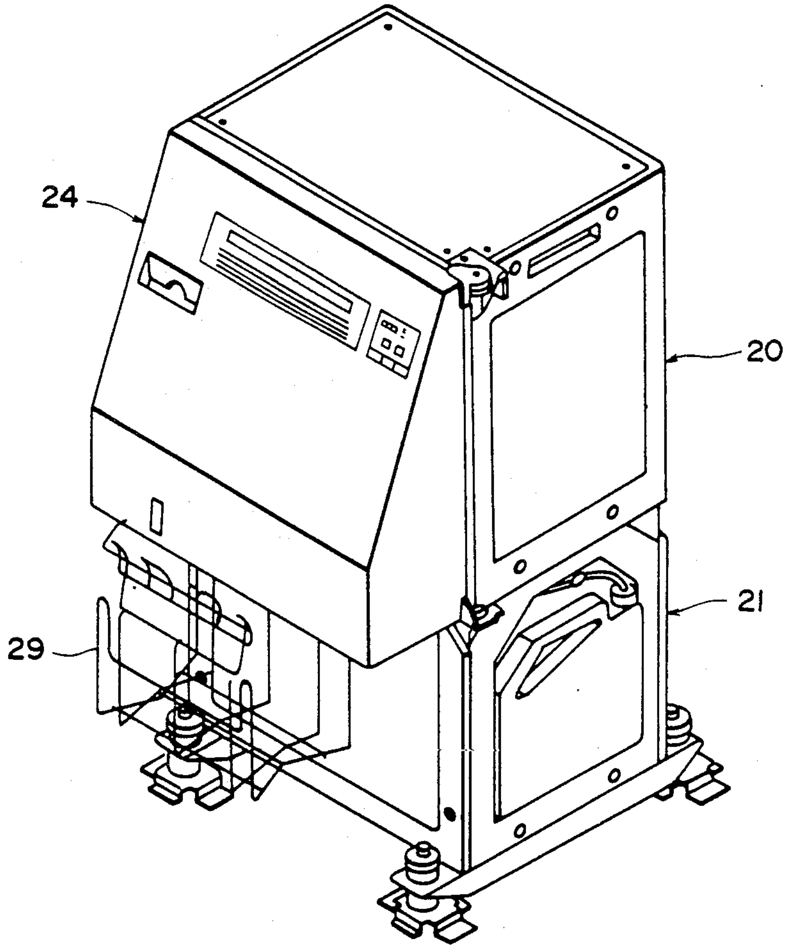
FIG. 4 is a perspective view of another embodiment of the ink jet printer of the present invention.
Figure 5:
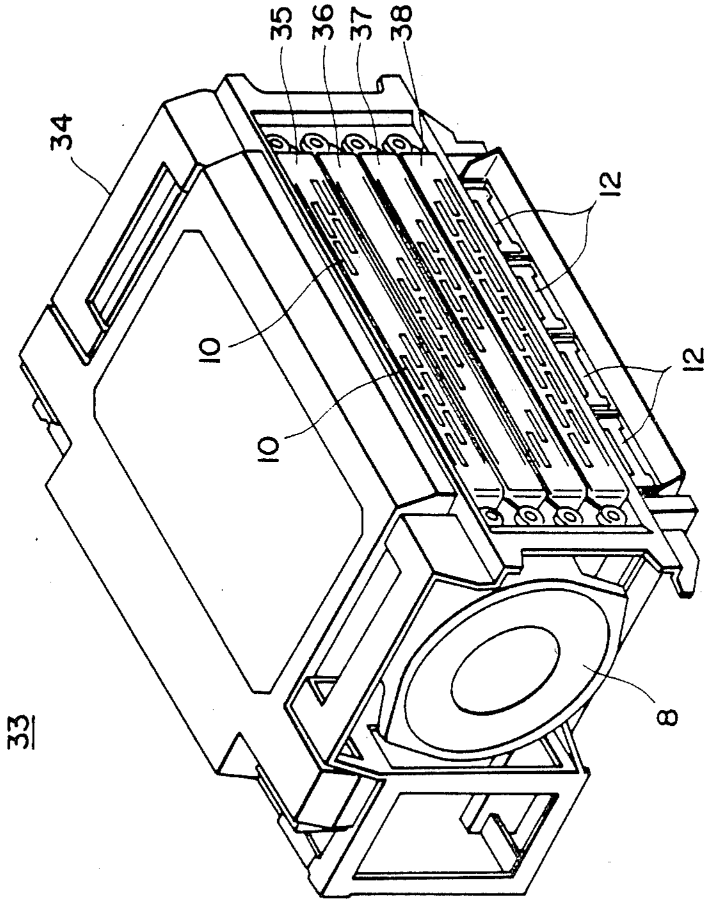
FIG. 5 is a perspective view of a head assembly used in the ink jet printer of FIG. 4, and FIGS. 6 and 7 block diagrams for controlling temperature in accordance with an embodiment of the present invention.

FIGS. 4 and 5 show an embodiment of a color ink jet printer to which the present invention is applicable. Numeral 20 denotes an upper unit in which head units are housed. Four bubble jet units (BJU's) 35–38 are removably mounted on a frame 34. In the present embodiment, the BJU's 35–38 are for black, cyan, magenta and yellow inks, respectively. The BJU's 35–38 each has a plurality of head elements 10 each having a number of nozzles, for example, 128 nozzles (not shown). The head elements 10 in the BJU's 35–38 are arranged in zig-zag fashion in upper and lower stages in non-overlapping manner between the upper and lower stages.

Second ink tanks 12 filled with color inks are removably mounted on the lower stages of the BJU's 35–38. The second ink tanks 12 are connected to the first ink tanks.

A stacker 29 formed by bending steel wires is arranged below a paper feed unit 24. A base unit 30 is attached to a bottom of the lower unit 21. A paper feed mechanism is provided in the paper feed unit 24, and a space for accommodating record sheets is formed under the paper feed mechanism.

The upper unit serves as a container for the head units, and a bubble jet assembly (BJA) 33 is removably mounted on the top thereof. A cap 34' is vertically movably mounted on the BJA 33.

Figure 6:
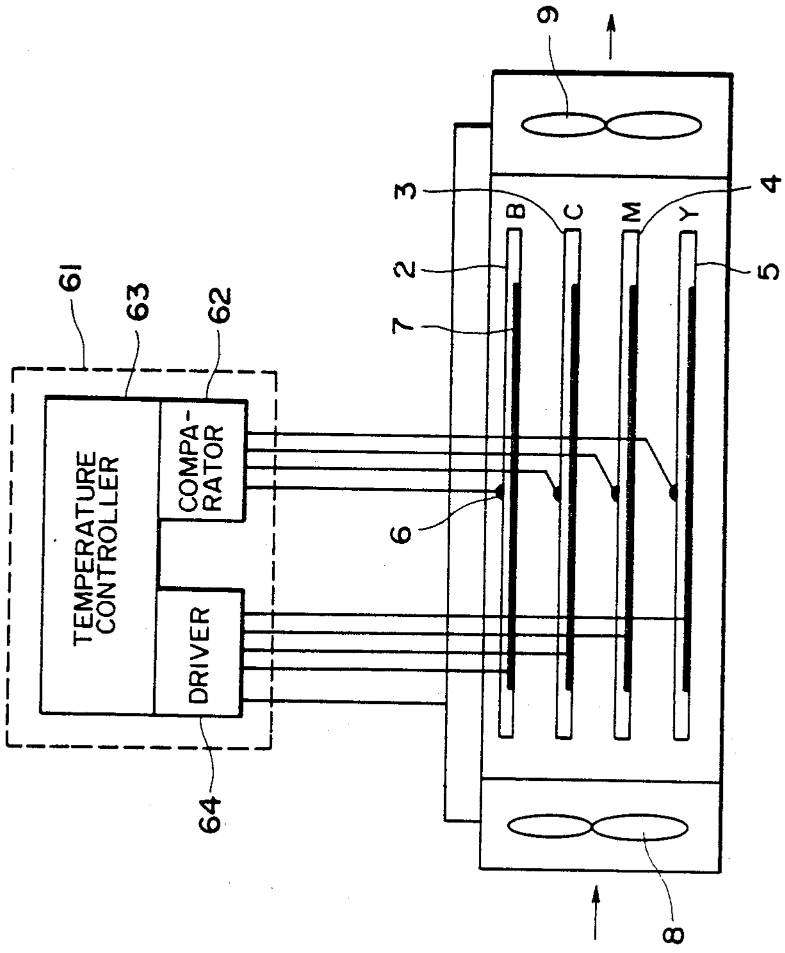

FIG. 6 shows a block diagram of an embodiment for energizing the heater and the fan.

The temperature of the head units sensed by the sensors 6 are supplied to a comparator 62 of temperature control means 61, and an output signal thereof is supplied to a processing unit 63. The signal is processed in the processing unit 63 to produce an output in accordance with a predetermined condition, and the output signal is supplied to a driver 64, which produces signals to energize the heaters 7 and/or the fans 8 and 9 so that the temperatures of the head units are maintained within the desired temperature range.

Figure 7:
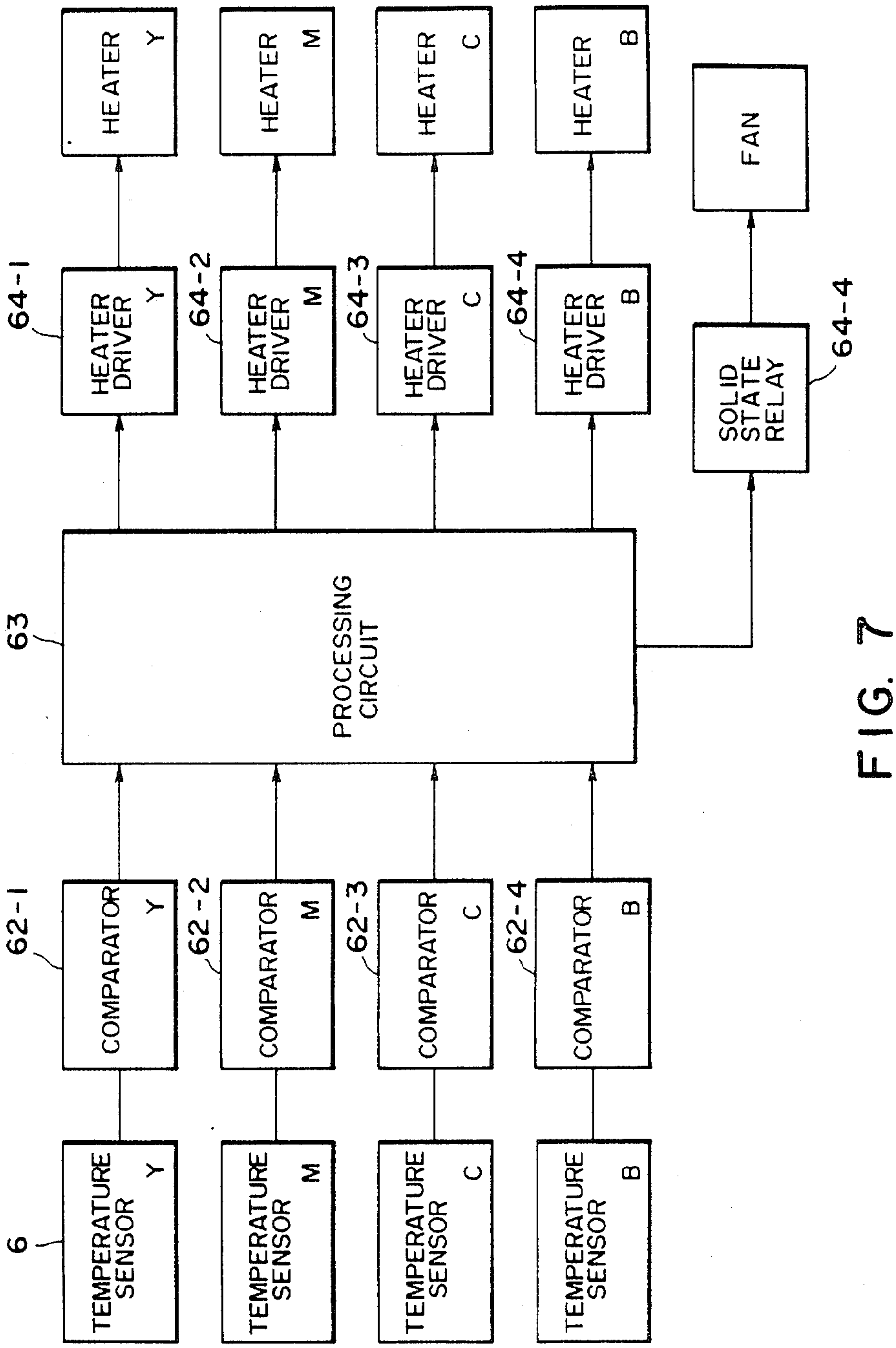

FIG. 7 shows a block diagram of FIG. 6 for each head unit. The signals from the temperature sensors 6 are compared by comparators 62-1 to 62-4 provided one for each of the head units, and the outputs thereof are supplied to the processing circuit (for example, microprocessor). The processing circuit processes the signals from the respective head units and sends signals to heater drivers and/or solid-state relays as required. The fans and the heaters are selectively energized in this manner so that the head units are kept in the proper temperature range.

The present invention is not limited to the illustrated embodiment so long as the object of the invention is achieved, and a number of modifications will be included in the present invention.

What is claimed is:

1. A temperature control system for an ink jet printer having a plurality of head units each having a heater and a temperature sensor, and a fan for cooling said plurality of head units, wherein said fan has a heat transfer coefficient represented by a gradient of a first line connecting a maximum heat generated by heads corresponding to a sum of heat generated by said head units and heat generated by said heaters and a maximum operable temperature of said printer, and said heaters each has a heat transfer coefficient represented by a gradient of a second line connecting said maximum heat generated by said heads and a minimum operable temperature of said printer.

2. A temperature control system according to claim 1 wherein a plurality of fans are provided.

3. A temperature control system according to claim 2 wherein said plurality of fans are controlled in one channel.

4. A temperature control system according to claim 1 wherein the heat generated by said heaters corresponds to a minimum temperature of a stable discharge temperature range of the head of said second line.

5. A temperature control system according to claim 1 wherein said second line passes a crosspoint of a temperature at which said fan is energized and the maximum heat generated by said heads.

6. An ink jet printer comprising:

a plurality of head units each having a heater and a temperature sensor;

a fan for cooling said plurality of head units; and temperature control means for processing signals from said temperature sensors to energize said heaters and/or said fan as required;

said fan having a heat transfer coefficient no smaller than that represented by a gradient of a first line connecting a maximum heat generated by heads corresponding to a sum of heat, generated by said head units and heat generated by said heaters and a maximum operable temperature of said ink jet printer;

said heaters each having a heat transfer coefficient represented by a gradient of a second line connecting said maximum heat of said heads and a minimum operable temperature of said ink jet printer

7. An ink jet printer according to claim 6 wherein a plurality of fans are provided.

8. An ink jet printer according to claim 6 wherein said plurality of fans are simultaneously energized.

9. An ink jet printer according to claim 6 wherein the heat generated by said heaters corresponds to a minimum temperature of a stable discharge temperature range of the head of said second line.

10. An ink jet printer according to claim 6 wherein said second line passes a crosspoint of a temperature at which said fan is energized and the maximum heat generated by said heads.

11. An ink jet printer according to claim 6 wherein said temperature control means includes a comparator for receiving signals from said temperature sensors, a processing unit for processing signals supplied from said comparator and a driver for receiving signals from said processing unit.

* * * * *

UNITED STATES PATENT AND TRADEMARK OFFICE

CERTIFICATE OF CORRECTION

PATENT NO. : 4,704,620
DATED : November 3, 1987
INVENTOR(S) : HIROO ICHIHASHI, ET AL.

It is certified that error appears in the above-identified patent and that said Letters Patent is hereby corrected as shown below:

COLUMN 1

Line 26, "charges" should read --changes--.
Line 46, "experimentarily" should read --experimentally--.
Line 55, "temperture" should read --temperature--.

COLUMN 2

Line 11, "controlled." should read --controlled,--.
Line 29, "trol" should read --trols--.
Line 37, "are" should read --is--.
Line 62, "other" should read --another--.

COLUMN 3

Line 25, "7 block" should read --7 show block--.
Line 32, "assembly" should read --assembly.--.

COLUMN 4

Line 35, "Accrodingly," should read --Accordingly,--.

COLUMN 5

Line 19, "achieve" should read --achieves--.
Line 38, "the first" should read --first--.

UNITED STATES PATENT AND TRADEMARK OFFICE
CERTIFICATE OF CORRECTION

PATENT NO. : 4,704,620

DATED : November 3, 1987

INVENTOR(S) : HIROO ICHIHASHI, ET AL.

It is certified that error appears in the above-identified patent and that said Letters Patent is hereby corrected as shown below:

COLUMN 6

Line 42, "heat," should read --heat--.
Line 49, "printer" should read --printer.--.

Signed and Sealed this

Twenty-sixth Day of April, 1988

*Attest:*

DONALD J. QUIGG

*Attesting Officer* *Commissioner of Patents and Trademarks*